US006859002B2

(12) United States Patent
Desbiolles et al.

(10) Patent No.: US 6,859,002 B2
(45) Date of Patent: Feb. 22, 2005

(54) DEVICE FOR CONTROLLING AN ELECTRONICALLY SWITCHED MOTOR BY MEANS OF A POSITION SIGNAL

(75) Inventors: Pascal Desbiolles, Thorens-Glieres (FR); Jean-Michael Beauprez, Mathounex sous Clermont (FR)

(73) Assignee: S.N.R. Roulements, Annecv Cedex (FR)

( * ) Notice: Subject to any disclaimer, the term of this patent is extended or adjusted under 35 U.S.C. 154(b) by 0 days.

(21) Appl. No.: 10/670,250

(22) Filed: Sep. 26, 2003

(65) Prior Publication Data

US 2004/0061459 A1 Apr. 1, 2004

(30) Foreign Application Priority Data

Sep. 27, 2002 (FR) .............................. 02 12014

(51) Int. Cl.[7] .................................................. H02P 6/00
(52) U.S. Cl. ........................ 318/254; 318/138; 318/439; 318/721; 318/722; 318/602; 324/200.02; 340/671
(58) Field of Search ................................. 318/254, 602, 318/721, 138, 439, 722; 324/200.02; 340/671

(56) References Cited

U.S. PATENT DOCUMENTS

| 4,228,396 A | * | 10/1980 | Palombo et al. ............ 324/163 |
| 4,599,561 A | * | 7/1986 | Takahashi et al. ..... 324/207.12 |
| 4,864,300 A | * | 9/1989 | Zaremba ........................ 341/6 |
| 5,774,068 A | * | 6/1998 | Seki ....................... 340/870.31 |

* cited by examiner

*Primary Examiner*—Rita Leykin
(74) *Attorney, Agent, or Firm*—Arent Fox

(57) ABSTRACT

A device for controlling an electronically switched motor which includes a coder (2) having a main multipole track (2a) and a so-called "revolution pip" multipole track (2b); a fixed sensor (3) delivering two digital position signals (A, B) and one revolution pip signal (C); a circuit for switching the currents in the phase windings of the motor which comprises $2*P*N$ switches; a control circuit for the switching circuit which is able to supply the switching signals for the switches which correspond to the state of the logic determined by the revolution pip signal (C) or by the position signals (A, B). The control device can be combined with a bearing and/or a motor equipped with such a device.

27 Claims, 6 Drawing Sheets

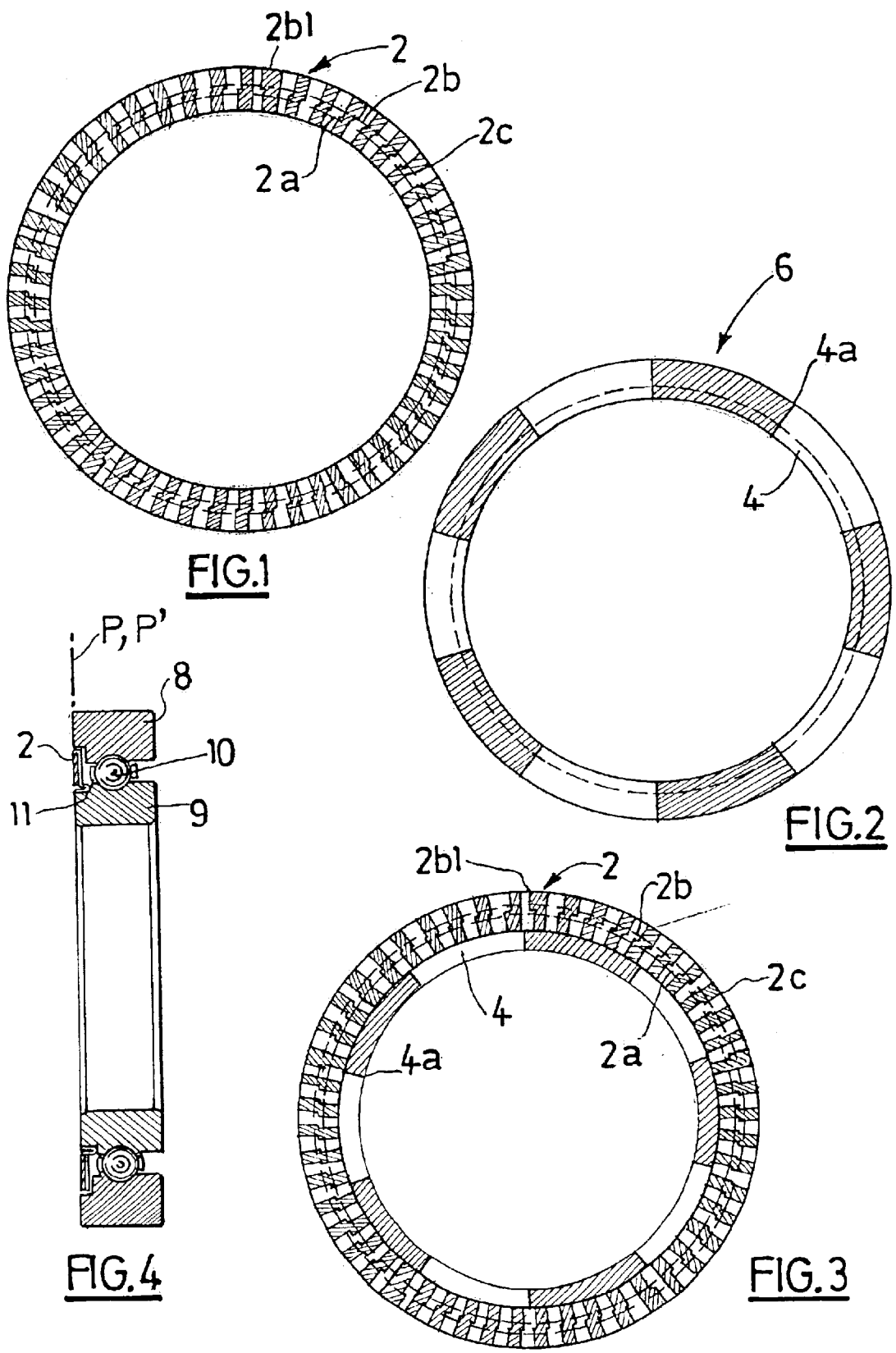

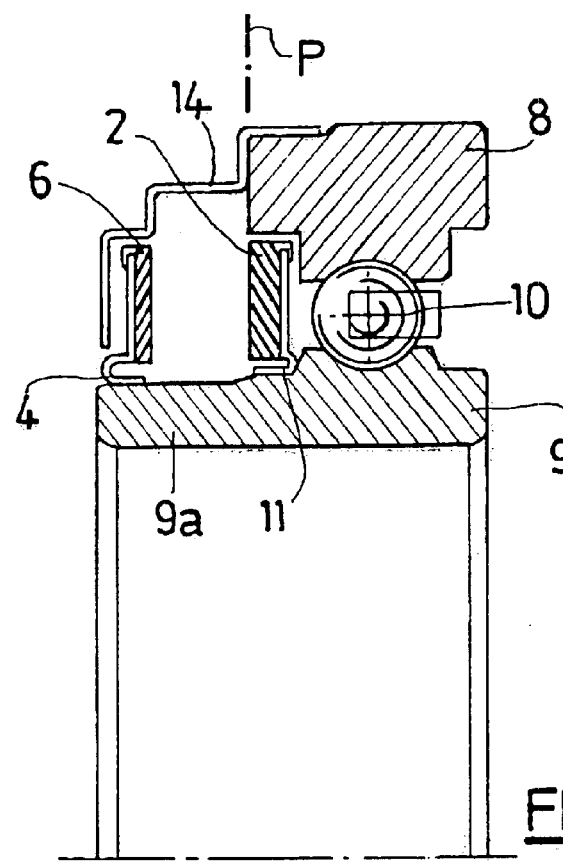
FIG.11
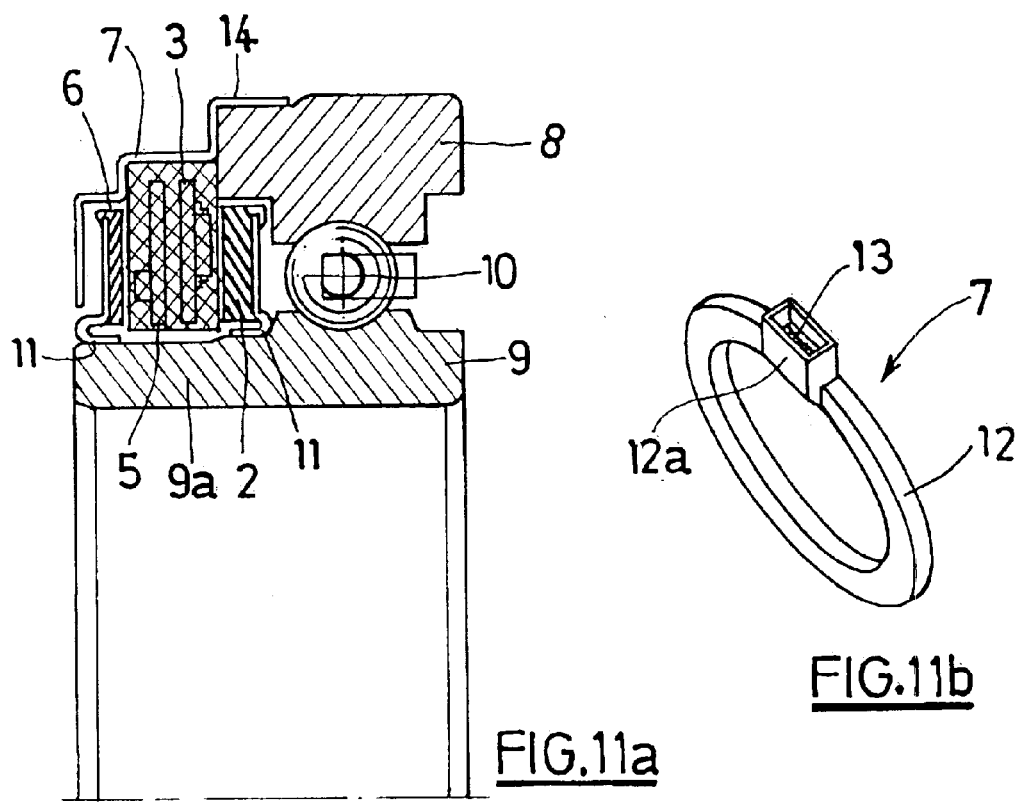
FIG.11a
FIG.11b

DEVICE FOR CONTROLLING AN ELECTRONICALLY SWITCHED MOTOR BY MEANS OF A POSITION SIGNAL

The invention relates to a device for controlling an electric motor of the electronic switching type comprising N pairs of poles and P phases, a bearing and a motor equipped with such a device, as well as a method for controlling such a motor.

Because of their high specific power, electronic switching motors, or brushless motors, can be used for controlling the rotation of a mechanical component in a large number of applications.

In particular one example of such an application is steering assistance for motor vehicles by means of an assisted steering system of the electrical type.

In the context of its application, it is necessary to precisely control the switching of the current in the phases of these motors in order to obtain a torque which is optimal.

It is known how to use a control device comprising a sensor provided with P sensitive elements disposed opposite a coder comprising N pairs of poles, the said coder being rotated by the motor.

In the case of a three-phase DC brushless motor, by making provision for the three sensitive elements to be out of phase with respect to each other by a mechanical angle making it possible to supply three electrical switching signals which are out of phase by 120° electrical, it is possible to control the switching between the phases of the motor.

However, this type of solution affords only limited precision in the determination of the switching times of the current in the phases.

This is because, in the known control devices, the precision of the switching signals is a function of the tolerances in production and magnetisation of the magnetic coders and positioning of the sensitive elements on their support, these two factors being able to be obtained only with non-zero tolerances.

Consequently, because of these tolerances, the precision of the phase difference between the switching signals is not exactly 120° electrical, which causes undesirable modulations of the torque supplied by the motor.

To resolve this problem, control devices have been proposed comprising a second sensor of the "resolver" type which makes it possible to know the absolute position of the rotor in order to improve the precision in control of the motor.

However, this type of solution is not satisfactory in that it gives rise to mechanical integration constraints because of the size of the sensors of the "resolver" type. In addition there is added the difficulty in conveying the analogue signals issuing from the resolver to a demodulator calculating the absolute position of the rotor.

In order in particular to overcome this drawback, the invention proposes a control device which uses a signal for the absolute position of the rotor in order to control the switching of the currents in the phase windings of the motor, the said absolute position being obtained with a single sensor/coder assembly.

To this end, and according to a first aspect, the invention proposes a device for controlling an electric motor of the electronic switching type comprising N pairs of poles and P phases, the said device comprising:

a coder intended to be rotated conjointly with the rotor of the motor, the said coder comprising a main multipole track and a so-called "revolution pip" multipole track which are concentric, the said revolution pip track comprising N singularities equally distributed angularly;

a fixed sensor disposed opposite to and at an air-gap distance from the coder, comprising at least three sensitive elements, at least two of which are positioned opposite the main track so as to deliver two periodic electrical signals S1, S2 in quadrature and at least one of which is positioned opposite the revolution pip track so as to deliver an electrical signal S3, the sensor comprising an electronic circuit able, from the signals S1, S2 and S3, to deliver two square digital position signals A, B in quadrature which represent the angular position of the rotor and a revolution pip signal C in the form of N pulses per revolution of the coder;

a circuit for switching the currents in the phase windings of the motor which comprises 2*P*N switches;

a circuit for controlling the switching circuit which is able:

when a pulse of the revolution pip signal C is detected, to determine the state of the switching logic of the currents in the phase windings which corresponds to the angular position of the said pulse;

according to the position signals A, B detected, to determine continuously the state of the switching logic which is adapted to the angular position of the rotor;

to supply the switching signals for the switches which correspond to the state of the logic determined by the revolution pip signal C or by the position signals A, B.

According to one embodiment, the device also comprises:

a third multipole track comprising N pairs of poles;

a second fixed sensor comprising P sensitive elements, the said sensitive elements being arranged opposite to and at an air-gap distance from the third multipole track so as to deliver signals U, V, W for switching the currents in the phase windings.

According to a second aspect, the invention proposes a bearing of the type comprising a fixed race intended to be associated with a fixed member, a rotating race intended to be rotated by the rotor of the electric motor and rolling bodies disposed between the said races, in which at least one coder of such a control device is associated with the rotating race.

According to a third aspect, the invention proposes an electronically switched motor equipped with such a control device.

According to a fourth aspect, the invention proposes a method for controlling such a motor, which comprises the following successive steps:

supply of the motor according to a pre-established time sequence so as to allow the rotation of the rotor and therefore that of the coder;

detection of a first revolution pip pulse;

determination of the state of the switching logic corresponding to the angular position of the said pulse;

sending to the switching circuit switching signals corresponding to the state determined;

iterative determination of the subsequent states of the switching logic from the position signals A, B;

sending to the switching circuits switching signals corresponding to the states determined.

According to one embodiment, the method provides for the initial use of the switching signals U, V, W for determining the states of the switching logic between the phases of the motor.

Other objects and advantages of the invention will emerge during the following description, given with reference to the accompanying drawings, in which:

FIG. 1 is a front view of a coder comprising a main multipole track and a revolution pip multipole track;

FIG. 2 is a front view of a coder comprising solely a third multipole track;

FIG. 3 is a front view of a coder comprising a main multipole track, a revolution pip multipole track and a third multipole track;

FIG. 4 is a partial view in longitudinal section of a bearing provided with a coder as depicted in FIG. 1 or 3;

Figure 12A:
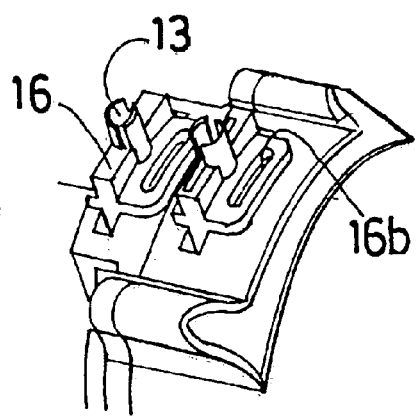
Figure 12:
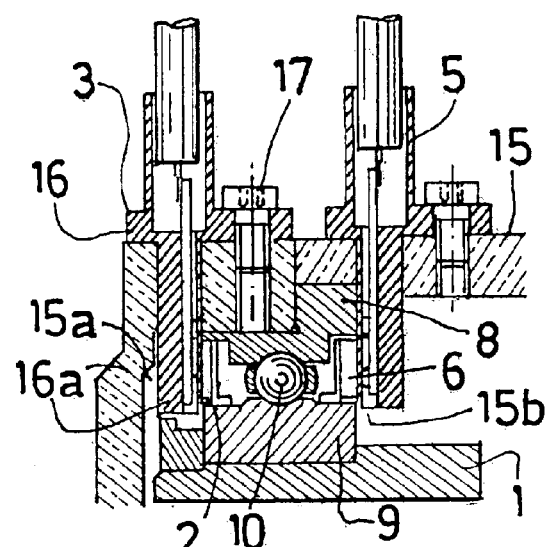
Figure 13A:
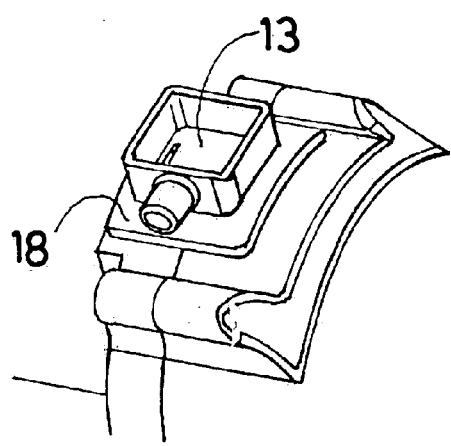
Figure 13:
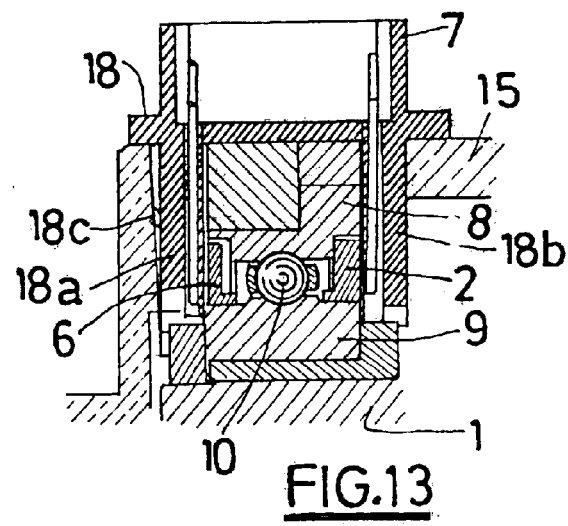
Figure 14A:
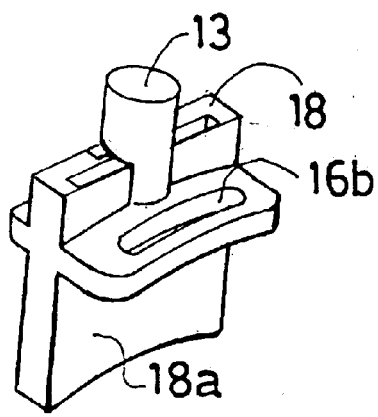
Figure 14:
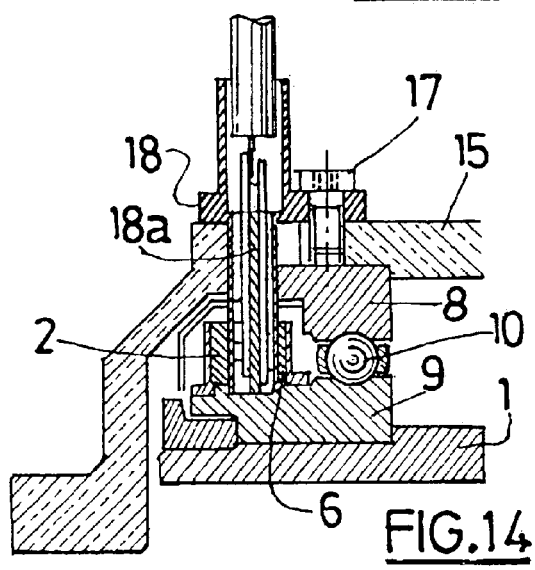
Figure 15:
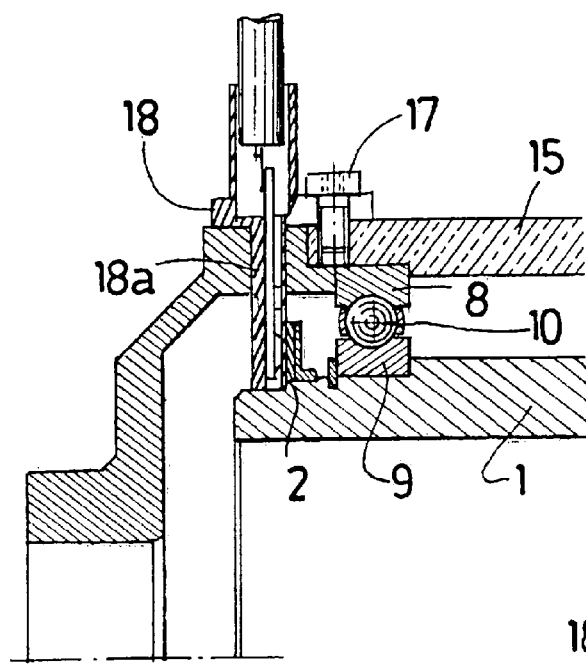
Figure 16:
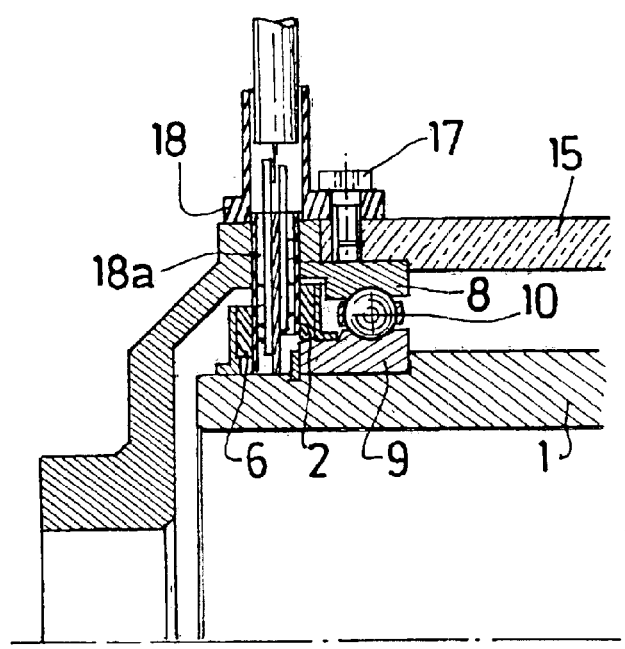
Figure 17:
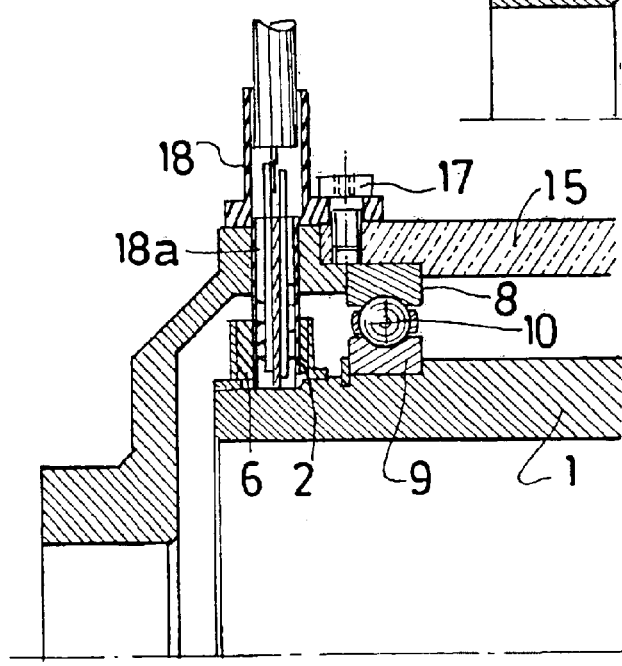

FIG. 11 is a partial view in longitudinal section of a bearing provided with two coders as depicted respectively in FIGS. 1 and 2, according to another embodiment; FIG. 11a is a view similar to that of FIG. 11 which shows the association on the fixed race of the bearing of a measurement means provided with two sensors; FIG. 11b is a perspective view of the measuring means of FIG. 11a;

FIG. 12 is a partial view in longitudinal section of a first embodiment of a motor provided with a bearing according to the invention; FIG. 12a is a partial perspective view of the two sensors of FIG. 12;

FIG. 13 is a partial view in longitudinal section of a second embodiment of a motor provided with a bearing according to the invention; FIG. 13a is a partial perspective view of the measuring means of FIG. 13;

FIG. 14 is a partial view in longitudinal section of a third embodiment of a motor provided with a bearing according to the invention; FIG. 14a is a perspective view of the measuring means of FIG. 14;

FIGS. 15 to 17 are partial views in longitudinal section respectively of three other embodiments of a motor according to the invention.

The invention relates to a device for controlling an electronically switched motor or brushless motor comprising N pairs of poles and P phases.

This type of motor comprises typically a rotor 1 carrying N pairs of North/South magnetic poles and a stator carrying P coils formed respectively by a phase winding, the rotor 1 being rotated in a known fashion by controlling the electrical supply in the P phase windings.

According to a first embodiment, the control device comprises a coder 2, such as the one depicted in FIG. 1, which comprises a main multipole track 2a and a so-called "revolution pip" multipole track 2b which are concentric, the said revolution pip track comprising N singularities 2b1 equally distributed angularly. The coder 2 is intended to make, conjointly with the rotor 1, a plurality of revolutions about its axis of rotation.

In a particular example, the coder 1 is formed by a multipole magnetic ring on which there are magnetised a plurality of pairs of North and South poles 2c equally distributed with a constant angular width so as to form the main 2a and revolution pip 2b tracks, a magnetic singularity 2b1 of the revolution pip track 2b being formed by two pairs of poles 2c which are different from the others.

According to the embodiment depicted in FIG. 1 (P=3, N=5), the main track 2a, disposed towards the inside of the ring 2, and the revolution pip track 2b, disposed towards the outside of the ring 2, comprise 50 pairs of poles 2c. The pairs of poles 2c of the revolution pip track 2b are offset in phase by a value $\phi$ with respect to those of the main track 2a.

The revolution pip track 2b comprises 5 magnetic singularities 2b1 spaced apart from one another by nine pairs of poles 2c. Each singularity 2b1 is formed by two pairs of poles 2c, the width of the poles being arranged so that a pole is out of phase by $-\phi$ with respect to the corresponding pole of the main track 2a. Thus each pulse of the signal C corresponds to the detection of a reversal of phase difference between the main track 2a and the revolution pip track 2b.

The control device also comprises a fixed sensor 3 disposed opposite to and at an air-gap distance from the coder 2.

The sensor comprises at least three sensitive elements, at least two of which are positioned opposite the main track 2a and at least one of which is positioned opposite the revolution pip track 2b.

In a particular example, the sensitive elements are chosen from the group comprising Hall effect sensors, magnetoresistors and giant magnetoresistors.

The sensor 3 used is able to deliver two periodic electrical signals S1, S2 in quadrature by means of the sensitive elements disposed opposite the main track 2a and an electrical signal S3 by means of the sensitive elements disposed opposite the revolution pip track 2b.

The principle of obtaining the signals S1 and S2 from a plurality of aligned sensitive elements is for example described in the document FR-2 792 403 issuing from the applicant.

However, sensors 3 comprising two sensitive elements which are able to deliver the signals S1 and S2 are also known.

The sensor 3 also comprises an electronic circuit which, from the signals S1, S2 and S3, delivers square position digital signals A, B in quadrature and a revolution pip signal C in the form of 5 (P=3 and N=5) electrical pulses per revolution of the coder 2.

A principle of obtaining the digital signals A, B and C and various embodiments of the magnetic singularities 2b1 are described in the documents FR-2 769 088 and EP-0 871 014.

By means of an adapted electronic processing of the signals A, B and C, it is possible to finely obtain in particular the absolute angular position of the coder 2 with respect to the sensor 3.

According to one embodiment, the sensor 3 also comprises an interpolator, for example of the type described in the document FR-2 754 063 issuing from the applicant, for increasing the resolution of the output signals.

The sensor 3 can be integrated on a silicon substrate or equivalent, for example AsGa, so as to form an integrated circuit personalised for a specific application, a circuit sometimes designated by the term ASIC in order to make reference to the integrated circuit designed partially or completely according to requirements.

Although the description is given in relation to a coder/magnetic sensor assembly, it is also possible to implement the invention in a similar manner using a technology of the optical type. For example, the coder 2 can be formed by a target made from metal or glass on which the main 2a and revolution pip 2b tracks have been etched so as to form an optical pattern similar to the multipole magnetic pattern disclosed above, the sensitive elements then being formed by optical detectors.

The control device also comprises a circuit for switching the currents in the phase windings of the motor.

The switching circuit comprises 2*P*N switches, for example each formed by a field effect transistor of the MOSFET type functioning at 20 kHz, which are disposed in a bridge so as to supply the phase windings in an appropriate manner.

The 2*P*N switches can be actuated in pairs according to a switching logic comprising 2*P*N possible states.

The control of the switching device, that is to say the selective actuation of the switches, is performed by a control circuit which is able:

when a pulse of the revolution pip signal C is detected, to determine the state of the switching logic of the currents in the phase windings which corresponds to the angular position of the said pulse;

according to the position signals A, B detected, to determine continuously the state of the switching logic which is adapted to the angular position of the rotor 1;

to supply the switching signals of the switches which correspond to the state of the logic determined by the revolution pip signal C or by the position signals A, B.

The control circuit can be produced in the form of a microprocessor integrating at least one switching logic of the switching circuit which determines the succession of the openings/closings of the various switches.

The functioning of the control device according to the first embodiment is then as follows.

Initially, that is to say when the device is brought into service, the motor is supplied with current by a pre-established control sequence, so as to allow the rotation of the rotor 1 and therefore that of the coder 2.

As soon as a first revolution pip pulse is detected, the control circuit determines the state of the switching logic of the currents in the phase windings which corresponds to the angular position of the said pulse and sends the corresponding switching signals to the switching circuit. In particular, the revolution pip pulses can be indexed with respect to the position of the rotor 1 so as to correspond to the start of the switching logic of the motor.

Next, the position signals A, B make it possible to know the absolute position, that is to say with respect to the revolution pip pulse, of the rotor 1 so as to continuously determine the state of the switching logic which is adapted. This is because, to each position of the rotor 1, there corresponds a state of the switching logic which makes it possible to obtain an optimum motor torque. The control circuit can therefore supply, to the switching circuit, the switching signals for the switches which correspond to the state of the logic determined.

In a variant, it is possible to provide a prior step of angular indexing of the revolution pip pulses with respect to the zeroing of the electromotive forces in the phases of the motor, so as to make the detection of a revolution pip pulse correspond to a change in state of the switching logic. This step can be performed on leaving the production line and on a dedicated bench, the value of the phase difference being able to be stored in a memory of the EEPROM or flash type of the control circuit so as to allow the readjustment of the switching times electronically. This storage of the angular positions of the revolution pip pulses makes it possible to dispense with mechanical indexing of the coder, which proves to be difficult and expensive.

According to the invention, the precision in the determination of the switching times is therefore limited only by the precision of the measurement of the angular position of the rotor 1.

In relation to FIGS. 2 and 3, a second embodiment of the control device is described, which also comprises:

a third multipole track 4 comprising N pairs of poles 4a;

a second fixed sensor 5 comprising P sensitive elements, the said sensitive elements being arranged opposite to and at an air-gap distance from the third multipole track so as to deliver signals U, V, W for switching the currents in the phase windings.

In the embodiment depicted (N=5 and P=3), the third multipole track 4 comprises 5 pairs of poles 4a and the sensor 5 comprises three sensitive elements which are out of phase by a mechanical angle making it possible to supply three electrical switching signals which are out of phase for example by 120° or 60° electrical.

According to the variant depicted in FIG. 3, the third multipole track 4 is disposed on the coder 2 whilst being concentric with the main track 2a and revolution pip track 2b.

According to the variant depicted in FIG. 2, the third multipole track 4 is provided on a second coder 6, the control device then comprising two coders 2, 6 (FIGS. 1 and 2).

In this second embodiment, it is possible to provide for the first and second sensors 3, 5 to be integrated into one and the same measuring means 7, because they use the same detection technology.

The difference in functioning between the second and first embodiment of the control device concerns the initial phase during which the first revolution pip pulse has not yet been detected.

This is because, in the second embodiment, it is possible, during this phase, to use the switching signals U, V, W in order to determine the states of the switching logic between the phases of the motor according to the position of the rotor 1. This is because these signals U, V, W make it possible to know roughly the absolute position of the rotor 1 as soon as it is set in rotation, and therefore to determine the state of the corresponding logic.

This second embodiment therefore makes it possible, as soon as the rotor 1 is set in rotation and until a first revolution pip pulse is detected, to control the motor more finely than in the case of the first embodiment, in that it does not require the use of a pre-established start-up procedure. In particular, the second embodiment makes it possible to control the motor without causing any random temporary rotation which may exist in the first embodiment.

In a variant, the control method by means of a device according to the second embodiment can comprise an iterative step of comparison between the position signals A, B and the revolution pip signals C, so as to detect any abnormality, that is to say discordance between the state generated by the signals A, B and that generated by the signals C. And, if an abnormality is detected, the determination of the subsequent switching times is carried out using the switching signals U, V, W, that is to say the passage of the control into degraded mode until the abnormality is resolved.

In relation to FIGS. 4 to 11, a description is given of a bearing equipped with at least one coder 2, 6 and/or at least one sensor 3, 5 of a control device according to the invention.

The bearing comprises a fixed outer race 8 intended to be associated with a fixed member, a rotating inner race 9 intended to be set in rotation by the rotor 1 of the electric motor and rolling bodies 10 disposed between the said races.

In the embodiments depicted, the coder or coders 2, 6 are moulded onto an annular cylindrical surface of an armature 11 which is associated, for example by shrinking on, with one face of the inner race 9.

In the embodiment depicted in FIG. 4, the control device comprises a coder 2 such as the one depicted in FIG. 1 or 3.

In the embodiments depicted in FIGS. 5 to 11, the control device comprises two coders 2, 6 as depicted respectively in FIGS. 1 and 2.

Figure 5:
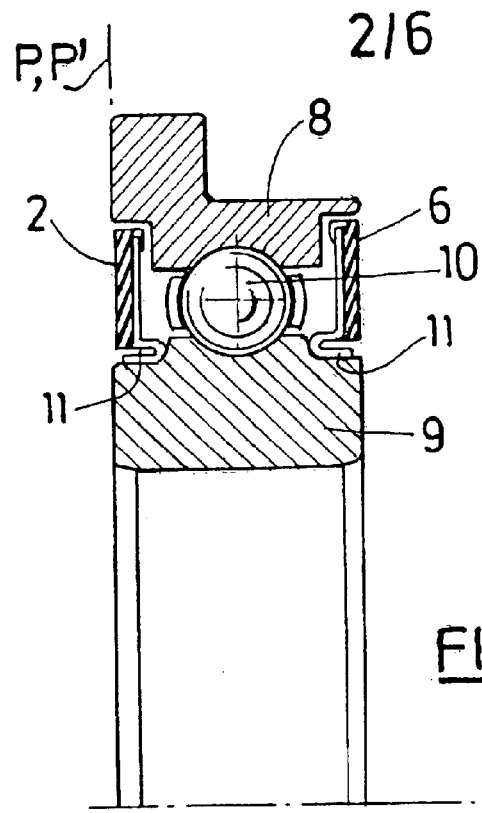
FIGS. 5 to 10 are partial views in longitudinal section of a bearing provided with two coders as depicted respectively in FIGS. 1 and 2, according to six embodiments.
Figure 6:
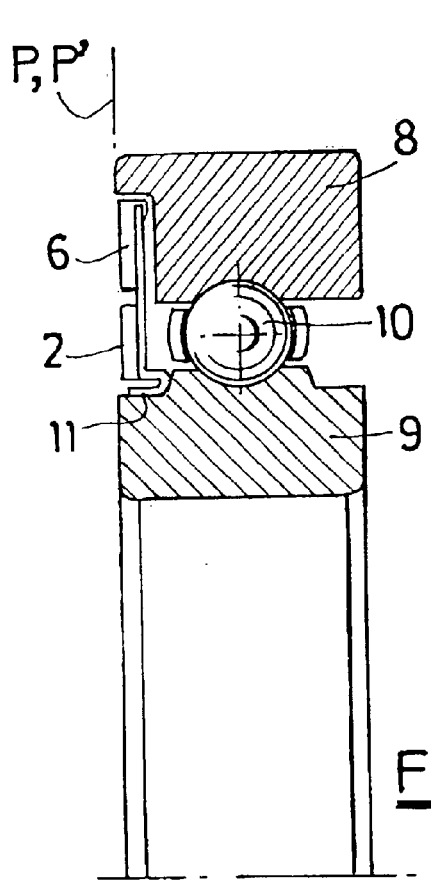
Figure 7:
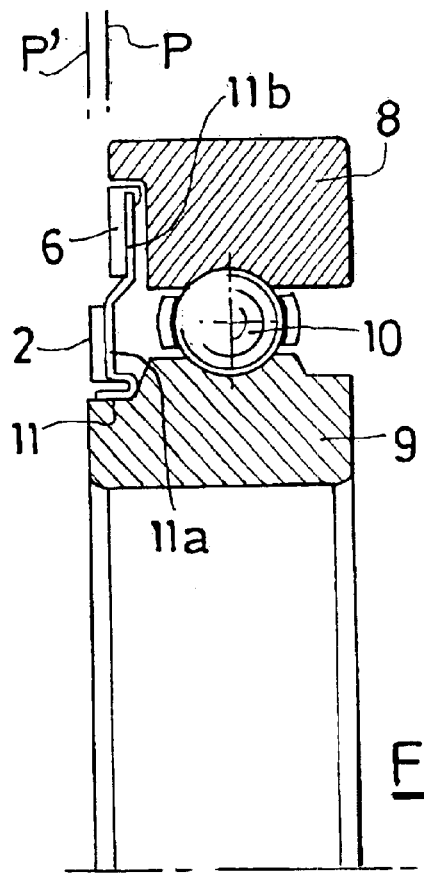

In FIGS. 5, 8, 9 and 11, each coder 2, 6 is associated with an armature 11, whilst in FIGS. 6, 7 and 11 the two coders 2, 6 are associated in an adjacent fashion on one and the same armature 11.

Figures 8, 9:
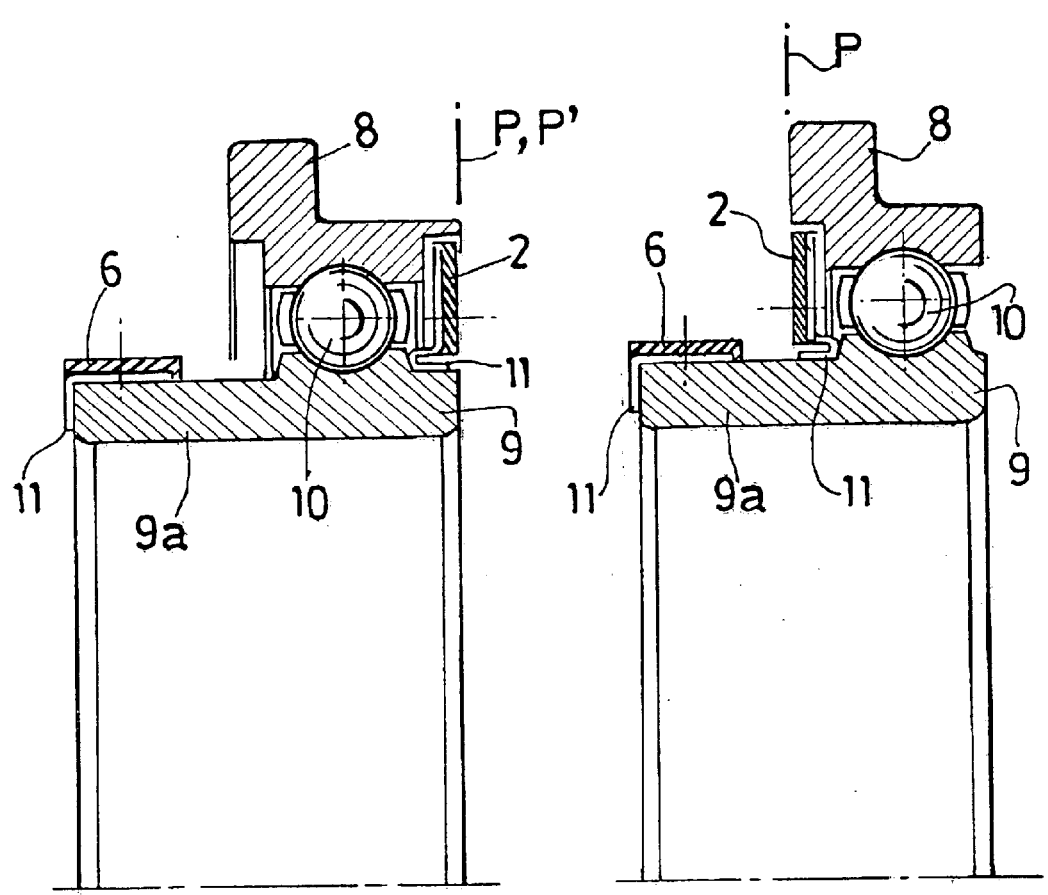

In FIGS. 5 and 8, the two coders 2, 6 are provided on each side of the rolling bodies 10, whilst in FIGS. 9 and 11 the two coders 2, 6 are provided on the same side of the rolling bodies 10. In FIG. 11, the two coders 2, 6 are disposed facing each other.

Figure 10:
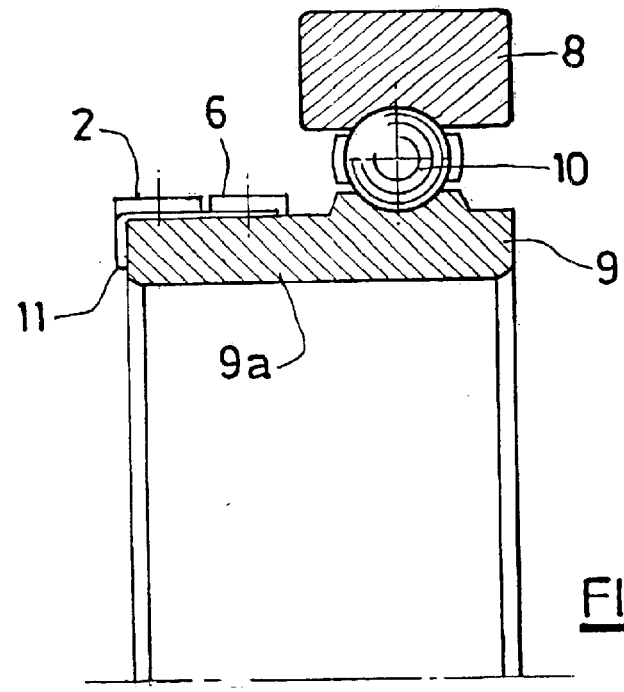

In FIGS. 8 to 11, the rotating race 9 comprises an axial extension 9a on which at least one coder 2, 6 is associated. In particular, in FIGS. 8 and 9, a coder 6 is associated on the said extension 9a so as to allow a radial reading of the pulses, the other coder 2 being associated on the rotating race 9 so as to allow a facial reading of the pulses. In FIG. 10, the armature 11 carrying the two coders 2, 6 is associated on the extension 9a so as to allow a radial reading of the pulses. In FIG. 11, the two coders 2, 6 are associated so as to allow a facial reading of the pulses respectively issuing from the said two coders.

In the embodiments depicted in FIGS. 5 to 9 and 11, at least one coder 2, 6 is associated with the rotating race 9 so that the external face of the said coder is substantially contained in the plane P of a lateral face of the fixed race 8 and/or in the plane P' of a lateral face of the rotating race 9. This characteristic, in particular disclosed in the document EP-0 607 719 issuing from the applicant, makes it possible on the one hand to protect the coder 2, 6 inside the bearing and on the other hand to be able to dissociate the sensor 3, 5 from the bearing whilst keeping control of the air gap.

In FIGS. 5 and 6, the planes P and P' are merged and the two coders 2, 6 are disposed substantially in these planes. In FIG. 7, the planes P and P' are offset axially and the armature 11 also comprises two axially offset surfaces 11a, 11b, each of the surfaces carrying a coder 2, 6 so that the said coders are respectively substantially contained in the planes P and P'. In FIGS. 8, 9 and 11, only one coder 2 is contained in the plane P.

In relation to FIG. 11, a bearing is described equipped with a measuring means 7 comprising the two sensors 3, 5, the said means being associated with the fixed ring 8.

The two coders 2, 6 are spaced apart from each other so as to present an annular space arranged so as to receive the measuring means 7 whilst disposing the sensitive elements of the sensors 3, 5 opposite to and at an air-gap distance from respectively a coder 2, 6 (FIG. 11a). To this end, the measuring means 7 (FIG. 11b) comprises a ring 12 provided with a protrusion 12a in which there are disposed, on each side, the two sensors 3, 5, the said protrusion housing the input/output connections 13 of the said sensors. The measuring means 7 is for example obtained by a plastic overmoulding technique.

In addition, the bearing comprises an armature 14 enabling the measuring means 7 to be associated on the fixed race 8 of the said bearing.

In relation to FIGS. 12 to 14 and 16, 17, an electronically switched motor equipped with a control device according to the invention is described, the said motor comprising a rotor 1 mounted for rotation by means of a bearing according to the invention. To this end, the outer race 8 of the bearing is associated with the casing 15 of the motor and the inner race 9 is associated, for example by shrinking on, with the rotor 1 of the said motor. The two sensors 3, 5 are disposed respectively in a slot 15a, 15b in the casing 15 and are associated with the casing 15 of the motor. In a variant, provision can be made for at least one sensor 3, 5 to be associated with the outer race 8 of the bearing.

In FIGS. 12 to 14, the bearing comprises two coders 2, 6 which are associated with the rotating race 9.

In FIG. 12, the two sensors 3, 5 are associated with the casing 15 by screwing so as to dispose the sensitive elements opposite to and at an air gap distance from respectively a coder 2, 6. To this end, the sensors 3, 5 comprise a body 16 provided with an extension 16a integrating the sensitive elements, an orifice 16b intended to receive an association screw 17, the input/output connections 13 of the sensor 3, 5.

In FIGS. 13 and 14, the two sensors 3, 5 are integrated in one and the same measuring means 7 comprising, in a single-piece fashion, a body 18 and the input/output connections 13 of the sensors 3, 5. In FIG. 13, the body 18 comprises two extensions 18a, 18b housing the sensitive elements, the said extensions being separated from each other so as to allow reading of the pulses issuing from the two coders 2, 6 which are disposed on each side of the rolling bodies 10. Moreover, the body 18 comprises an elastic support tongue 18c intended to allow the positioning of the sensitive elements at an air-gap distance from the coder 2. In FIGS. 14, the body 18 comprises an extension 18a housing on each side the sensitive elements so as to allow reading of the pulses issuing from the two coders 2, 6 which are disposed opposite each other.

In FIGS. 16 and 17, at least one coder 2, 6 is associated with the rotor 1. To this end, the armature 11 is for example shrunk onto a surface provided on the periphery of the rotor 1. In these embodiments, the measuring means 7 has a structure similar to that depicted in FIG. 14a.

In FIGS. 16 and 17, the control device comprises two coders 2, 6 as depicted respectively in FIGS. 1 and 2. In the embodiment in FIG. 16, a coder 2, 6 is associated with the rotating race 9 of the bearing and the other coder 6, 2 is associated with the rotor 1, whilst in FIG. 17 the two coders 2, 6 are associated with the rotor 1.

In FIG. 15, the motor is equipped with a control device which comprises a coder 2 as depicted in FIG. 1 or 3, the said coder being associated with the rotor 1 and the sensor being associated with the casing 15. In this embodiment, the bearing therefore has no element of the control device.

What is claimed is:

1. A device for controlling an electric motor of the electronic switching type comprising N pairs of poles and P phases, the said device comprising:
 a coder (2) designed to be rotated conjointly with the rotor (1) of the motor, said coder comprising a main multipole track (2a) and a multipole track (2b) which are concentric, said revolution pip track comprising N singularities (2b1) equally distributed angularly;
 a fixed sensor (3) disposed opposite to and at an air-gap distance from the coder (2), comprising at least three first sensitive elements, at least two of which are positioned opposite the main track (2a) so as to deliver two periodic electrical signals S1, S2 in quadrature and at least one of which is positioned opposite the revolution pip track (2b) so as to deliver an electrical signal S3, the sensor (3) further comprising an electronic circuit able, from the signals S1, S2 and S3, to deliver two square digital position signals (A, B) in quadrature which represent the angular position of the rotor (1) and a revolution pip signal (C) in the form of N pulses per revolution of the coder (2);
 a circuit for switching the currents in the phase windings of the motor which comprises 2*P*N switches;
 a circuit for controlling the switching circuit which is able:
  when a pulse of the revolution pip signal (C) is detected, to determine the state of the switching logic of the currents in the phase windings which corresponds to the angular position of the pulse;

according to the position signals (A, B) detected, to determine continuously the state of the switching logic which is adapted to the angular position of the rotor (1);

to supply the switching signals for the switches which correspond to the state of the logic determined by the revolution pip signal (C) or by the position signals (A, B).

2. A device according to claim 1, further comprising:

a third multipole track (4) comprising N pairs of poles (4*a*);

a second fixed sensor (5) comprising P second sensitive elements, the second sensitive elements being arranged opposite to and at an air-gap distance from the third multipole track (4) so as to deliver signals (U, V, W) for switching the currents in the phase windings.

3. A device according to claim 2, characterised in that the third multipole track (4) is disposed on the coder (2) whilst being concentric with the main track (2*a*) and revolution pip track (2*b*).

4. A device according to claim 2, characterised in that the third multipole track (4) is provided on a second coder (6).

5. A device according to any one of claims 1 to 4, characterised in that each multipole track (2*a*, 2*b*, 4) is formed from a magnetic ring on which there are magnetised North and South poles equally distributed with a constant angular width, a magnetic singularity (2*b*1) of the revolution pip track (2*b*) being formed by two pairs of adjacent poles whose junction is different from the others.

6. A device according to claim 2, characterised in that the first and second sensors (3, 5) are integrated in one and the same measuring means (7).

7. A bearing and control device for an electric motor, said bearing comprising a fixed race (8) intended to be associated with a fixed member, a rotating race (9) intended to be set in rotation by the rotor (1) of the electric motor and rolling bodies (10) disposed between said races and said control device according to claim 1 wherein at least one coder (2, 6) of a said control device is associated with the rotating race (9) of said bearing.

8. A bearing and device according to claim 7, wherein said at least one coder (2, 6) is associated with the rotating race (9) so that the external face of the said at least one coder is substantially contained in the plane P of a lateral face of the fixed race (8).

9. A bearing and device according to claim 7, wherein said at least one coder (2, 6) is associated with the rotating race (9) so that the external face of the said coder is substantially contained in the plane P' of a lateral face of the rotating race (9).

10. A bearing and device according to claim 7, characterised in that the rotating race (9) comprises an axial extension (9*a*) on which said at least one coder (2, 6) is associated.

11. A bearing and device according to claim 7, wherein said at least one coder (2, 6) is associated on the rotating race (9) so as to allow a radial reading of the pulses.

12. A bearing and device according to claim 7, wherein said at least one coder (2, 6) is associated on the rotating race (9) so as to allow a facial reading of the pulses.

13. A bearing and device according to claim 7 characterised in that said at least one coder (2, 6) is carried by an association armature (11).

14. A bearing and device according to claim 13 wherein said device further comprises:

a third multipole track (4) comprising N pairs of poles (4*a*);

a second fixed sensor (5) comprising P second sensitive elements, the second sensitive elements being arranged opposite to and at an air-gap distance from the third multipole track (4) so as to deliver signals (U, V, W) for switching the currents in the phase windings;

the third multipole track (4) being provided on a second coder (6); and wherein the two coders (2, 6) are carried by the same association armature (11).

15. A bearing and device according to claim 14, characterised in that the two coders (2, 6) are provided on the same side of the rolling bodies (10).

16. A bearing and device according to claim 15, characterised in that the two coders (2, 6) are disposed opposite each other.

17. A bearing and device according to claim 14, characterised in that the two coders (2, 6) are provided on each side of the rolling bodies (10).

18. A bearing and device according to claim 7, characterised in that said at least one sensor (3, 5) of said control device is associated with the fixed race (8) of the bearing.

19. An electronically switched motor equipped with a control device according to claim 1, said motor comprising a rotor (1) mounted for rotation by means of a bearing comprising a fixed race (8) intended to be associated with a fixed member, a rotating race (9) intended to be set in rotation by the rotor (1) of the electric motor and rolling bodies (10) disposed between the said races, said bearing being characterised in that at least one coder (2, 6) of the control device is associated with the rotating race (9) and at least one sensor (3, 5) of the control device is associated with the fixed race (8) of the bearing.

20. An electronically switched motor equipped with a control device according to claim 2, said motor comprising a rotor (1) mounted for rotation by means of a bearing comprising a fixed race (8) intended to be associated with a fixed member, a rotating race (9) intended to be set in rotation by the rotor (1) of the electric motor and rolling bodies (10) disposed between the said races, said bearing being characterised in that at least one coder (2, 6) of the control device is associated with the rotating race (9) and, at least one sensor (3, 5) being associated with a fixed piece of the motor.

21. A motor according to claim 20 wherein said, at least one of said first and second sensors (3, 5) comprises at least one elastic support tongue (18*c*) intended to allow the positioning of the sensitive elements at an air-gap distance from the coder (2, 6) whose pulses they are to detect.

22. A motor according to any one of claims 19 to 21, characterised in that said at least one coder (2, 6) is associated with the rotor (1).

23. An electronically switched motor equipped with a control device according to claim 1, of the type comprising a rotor (1) and a fixed piece, in which at least one coder (2, 6) is associated with the rotor (1) and at least one sensor (3, 5) is associated with the fixed piece.

24. A method for controlling an electronically switched motor, equipped with a control device, said control device comprising N pairs of poles and P phases, a coder (2) intended to be rotated conjointly with the rotor (1) of the motor, the said coder comprising a main multipole track (2*a*) and a revolution pip multipole track (2*b*) which are concentric, the said revolution pip track comprising N singularities (2*b*1) equally distributed angularly; a fixed sensor (3) disposed opposite to and at an air-gap distance from the coder (2), comprising at least three sensitive elements, at least two of which are positioned opposite the main track (2*a*) so as to deliver two periodic electrical signals S1, S2 in quadrature and at least one of which is positioned opposite the revolution pip track (2b) so as to deliver an electrical signal S3, the sensor (3) comprising an electronic circuit able, from the signals S1, S2 and S3, to deliver two square digital position signals (A, B) in quadrature which represent the angular position of the rotor (1) and a revolution pip signal (C) in the form of N pulses per revolution of the coder (2); a circuit for switching the currents in the phase windings of the motor which comprises 2*P*N switches; a circuit for controlling the switching circuit which is able: when a pulse of the revolution pip signal (C) is detected, to determine the state of the switching logic of the currents in the phase windings which corresponds to the angular position of the said pulse; according to the position signals (A, B) detected, to determine continuously the state of the switching logic which is adapted to the angular position of the rotor (1); to supply the switching signals for the switches which correspond to the state of the logic determined by the revolution pip signal (C) or by the position signals (A, B);

said motor comprising a rotor (1) mounted for rotation by means of a bearing comprising a fixed race (8) intended to be associated with a fixed member, a rotating race (9) intended to be set in rotation by the rotor (1) of the electric motor and rolling bodies (10) disposed between the said races, said bearing being characterised in that at least one coder (2, 6) of the control device is associated with the rotating race (9) and at least one sensor (3, 5) of the control device is associated with the fixed race (8) of the bearing, comprising the following successive steps:

supplying the motor according to a pre-established time sequence so as to allow the rotation of the rotor (1) and therefore that of the coder (2);

detecting a first revolution pip pulse;

determining the state of the switching logic corresponding to the angular position of the said pulse;

sending to the switching circuit switching signals corresponding to the state determined;

iteratively determining of the subsequent states of the switching logic from the position signals (A, B);

sending to the switching circuits switching signals corresponding to the states determined.

25. A method for controlling an electronically switched motor, equipped with a control device.

said control device comprising N pairs of poles and P phases, a coder (2) intended to be rotated conjointly with the rotor (1) of the motor, the said coder comprising a main multipole track (2a) and a revolution pip multipole track (2b) which are concentric, said revolution pip track comprising N singularities (2b1) equally distributed angularly; a fixed sensor (3) disposed opposite to and at an air-gap distance from the coder (2), comprising at least three sensitive elements, at least two of which are positioned opposite the main track (2a) so as to deliver two periodic electrical signals S1, S2 in quadrature and at least one of which is positioned opposite the revolution pip track (2b) so as to deliver an electrical signal S3, the sensor (3) comprising an electronic circuit able, from the signals S1, S2 and S3, to deliver two square digital position signals (A, B) in quadrature which represent the angular position of the rotor (1) and a revolution pip signal (C) in the form of N pulses per revolution of the coder (2); a circuit for switching the currents in the phase windings of the motor which comprises 2*P*N switches; a circuit for controlling the switching circuit which is able; when a pulse of the revolution pip signal (C) is detected, to determine the state of the switching logic of the currents in the phase windings which corresponds to the angular position of the said pulse; according to the position signals (A, B) detected, to determine continuously the state of the switching logic which is adapted to the angular position of the rotor (1); to supply the switching signals for the switches which correspond to the state of the logic determined by the revolution pip signal (C) or by the position signals (A, B), a third multipole track (4) comprising N pairs of poles (4a); and a second fixed sensor (5) comprising P sensitive elements, the said sensitive elements being arranged opposite to and at an air-gap distance from the third multipole track (4) so as to deliver signals (U, V, W) for switching the currents in the phase windings;

said motor comprising a rotor (1) mounted for rotation by means of a bearing comprising a fixed race (8) intended to be associated with a fixed member, a rotating race (9) intended to be set in rotation by the rotor (1) of the electric motor and rolling bodies (10) disposed between the said races, said bearing being characterised in that at least one coder (2, 6) of the control device is associated with the rotating race (9) and at least one sensor (3, 5) of the control device is associated with the fixed race (8) of the bearing, comprising the following successive steps:

initially using the switching signals (U, V, W) for determining the states of the switching logic between the phases of the motor;

detecting a first revolution pip pulse;

determination of the state of the switching logic corresponding to the angular position of the said pulse;

sending to the switching circuit the switching signals corresponding to the determined state;

iteratively determining of the subsequent states of the switching logic from the position signals (A, B);

sending to the switching circuit switching signals corresponding to the determined states.

26. A method according to claim 25, further comprising an iterative step of comparison between the position signals (A, B) and the revolution pip signals (C), so as to detect any abnormality and, if an abnormality is detected, the determination of the subsequent switching times from the switching signals (U, V, W).

27. A method according to any one of claims 24 to 26, further comprising a prior step of angular indexing of the revolution pip pulses with respect to the zeroing of the electromotive forces in the phases of the motor.

* * * * *